(12) United States Patent
Svensson et al.

(10) Patent No.: US 9,297,330 B2
(45) Date of Patent: Mar. 29, 2016

(54) SYSTEM AND METHOD FOR ESTIMATING AND CONTROLLING TEMPERATURE OF ENGINE COMPONENT

(71) Applicant: Caterpillar Inc., Peoria, IL (US)

(72) Inventors: Kenth Svensson, Peoria, IL (US); Carl Hergart, Bellingham, WA (US); Chad Koci, Washington, IL (US); Jason J. Rasmussen, Hopewell, IL (US)

(73) Assignee: Caterpillar Inc., Peoria, IL (US)

( * ) Notice: Subject to any disclaimer, the term of this patent is extended or adjusted under 35 U.S.C. 154(b) by 0 days.

(21) Appl. No.: 14/482,774

(22) Filed: Sep. 10, 2014

(65) Prior Publication Data

US 2015/0059690 A1 Mar. 5, 2015

Related U.S. Application Data

(63) Continuation-in-part of application No. 14/018,671, filed on Sep. 5, 2013.

(51) Int. Cl.
| | |
|---|---|
| *F02D 41/00* | (2006.01) |
| *F02D 41/38* | (2006.01) |
| *F02D 41/40* | (2006.01) |
| *F02D 35/02* | (2006.01) |

(52) U.S. Cl.
CPC .......... *F02D 41/38* (2013.01); *F02D 41/0007* (2013.01); *F02D 35/026* (2013.01); *F02D 41/402* (2013.01); *F02D 2200/022* (2013.01); *F02D 2200/0406* (2013.01); *F02D 2200/701* (2013.01); *F02D 2200/703* (2013.01); *F02D 2200/704* (2013.01)

(58) Field of Classification Search
CPC .......... F02D 41/0002; F02D 2041/001; F02D 41/0025; F02D 41/1454; F02D 41/221; F02D 41/222; F02D 2200/0414; F02D 41/0007; F02D 29/02; Y02T 10/42; Y02T 10/40; Y02T 10/144; G01F 1/6842; F02B 37/183
USPC .......... 701/103, 104, 105, 102, 108; 73/114.31, 114.34, 114.42, 114.49; 60/602, 603, 605.2
See application file for complete search history.

(56) References Cited

U.S. PATENT DOCUMENTS

| | | | |
|---|---|---|---|
| 5,483,941 A | 1/1996 | Cullen et al. | |
| 5,931,140 A * | 8/1999 | Maloney | F02D 41/0072 123/480 |
| 5,983,876 A | 11/1999 | Irons et al. | |
| 6,003,496 A * | 12/1999 | Maloney | F02D 41/047 123/480 |
| 6,941,245 B2 | 9/2005 | Longnecker et al. | |
| 2013/0008417 A1 | 1/2013 | Sankar et al. | |
| 2014/0074381 A1 * | 3/2014 | Sczomak | F02D 41/401 701/105 |

* cited by examiner

*Primary Examiner* — Hai Huynh
*Assistant Examiner* — Raza Najmuddin

(57) ABSTRACT

An engine system is provided. The engine system includes an ambient condition module configured to generate a signal indicative of a state of ambient air. The engine system also includes an operational parameter sensor configured to generate a signal indicative of one or more operational parameters associated with the engine. The engine system further includes a controller communicably coupled to the ambient condition module and the operational parameter sensor. The controller is configured to receive the signal indicative of the pressure of ambient air and the signal indicative of the one or more operational parameters associated with the engine. The controller estimates the temperature of at least one of a valve, a piston, a liner, a cylinder head, and a pre-chamber of the engine as a function of the received signals and parameters associated with fuel delivery to the engine.

20 Claims, 7 Drawing Sheets

SYSTEM AND METHOD FOR ESTIMATING AND CONTROLLING TEMPERATURE OF ENGINE COMPONENT

CROSS-REFERENCE TO RELATED APPLICATIONS

The present application is a continuation-in-part of U.S. application Ser. No. 14/018,671, filed on Sep. 5, 2013, the entire disclosure of which is hereby incorporated by reference for all purposes.

TECHNICAL FIELD

The present disclosure relates to a system and method for estimating and controlling a temperature of an engine component, and more specifically for the estimation and control of the temperature of a valve, a piston, a liner, a cylinder head, or a pre-chamber associated with an engine.

BACKGROUND

For a given configuration, an Internal Combustion Engine (ICE) operating at a higher altitude tends to reach higher temperatures compared to the engine operating at a lower altitude when producing a same amount of power. This may cause overheating of engine components, such as, for example, valves, pistons, and other in-cylinder components associated with the engine. Overheating may in turn lead to reduced life of an engine valve. In order to prevent overheating, the engine is derated by reducing a fuel supply to the engine. Typical calibration strategies consider constraints such as exhaust gas temperature, peak cylinder pressure, turbocharger speed, compressor outlet temperature, and smoke opacity. Such strategies may not consider a temperature of the valve, a piston, a liner, a cylinder head, and a pre-chamber, which in some situations may be a limiting factor in the system.

Some prior attempts to account for the valve temperature limitations include correlating it with the exhaust gas temperature. Such an approach may be inaccurate, because the valve temperatures may be more aligned with peak cylinder temperatures during a cycle than the exhaust gas temperature. Other derate strategies may involve advancing injection timing to reduce the exhaust gas temperature. This may lead to a more substantial pre-burned spike, relatively higher exhaust gas temperatures, or combinations thereof, and in turn cause an increase in the temperature of the valve.

U.S. Pat. No. 5,483,941 describes a method for use with a vehicle including a multi-cylinder internal combustion engine having exhaust valves. The method controls the temperature of the exhaust valves during fuel cutoff modes of engine operation utilizing a bit pattern representation of the engine cylinders. The method includes blocking fuel flow to the cylinders in an indexed cylinder firing pattern to vary which cylinders receive fuel so as to maintain acceptable exhaust valve temperature levels. The method may also include operating the engine with a lean air/fuel ratio to maintain acceptable catalytic converter temperature levels.

SUMMARY OF THE DISCLOSURE

According to an aspect of the disclosure, an engine system includes an ambient condition module configured to generate a signal indicative of a state of ambient air, an operational parameter sensor configured to generate a signal indicative of one or more operational parameters associated with the engine, and a controller communicably coupled to the ambient air pressure sensor and the operational parameter sensor. The controller is configured to receive the signal indicative of the state of ambient air and the signal indicative of the one or more operational parameters associated with the engine, and estimate a temperature of at least one of a valve, a piston, a liner, a cylinder head, and a pre-chamber of the engine as a function of the received signals and parameters associated with fuel delivery in a single fuel cycle of the engine.

According to another aspect of the disclosure, a method for determining a temperature of a component of an engine includes receiving a signal indicative of a state of ambient air, receiving a signal indicative of one or more operational parameters associated with the engine, estimating the temperature of a valve, a piston, a liner, a cylinder head, and a pre-chamber of the engine as a function of the received signals and parameters associated with fuel delivery in a single fuel cycle of the engine, and derating a power of the engine when the estimated temperature exceeds a threshold temperature

DETAILED DESCRIPTION

Reference will now be made in detail to specific embodiments or features, examples of which are illustrated in the accompanying drawings. Generally, corresponding or similar reference numbers will be used throughout the drawings to refer to the same or corresponding parts, unless specified otherwise.

Figure 1:
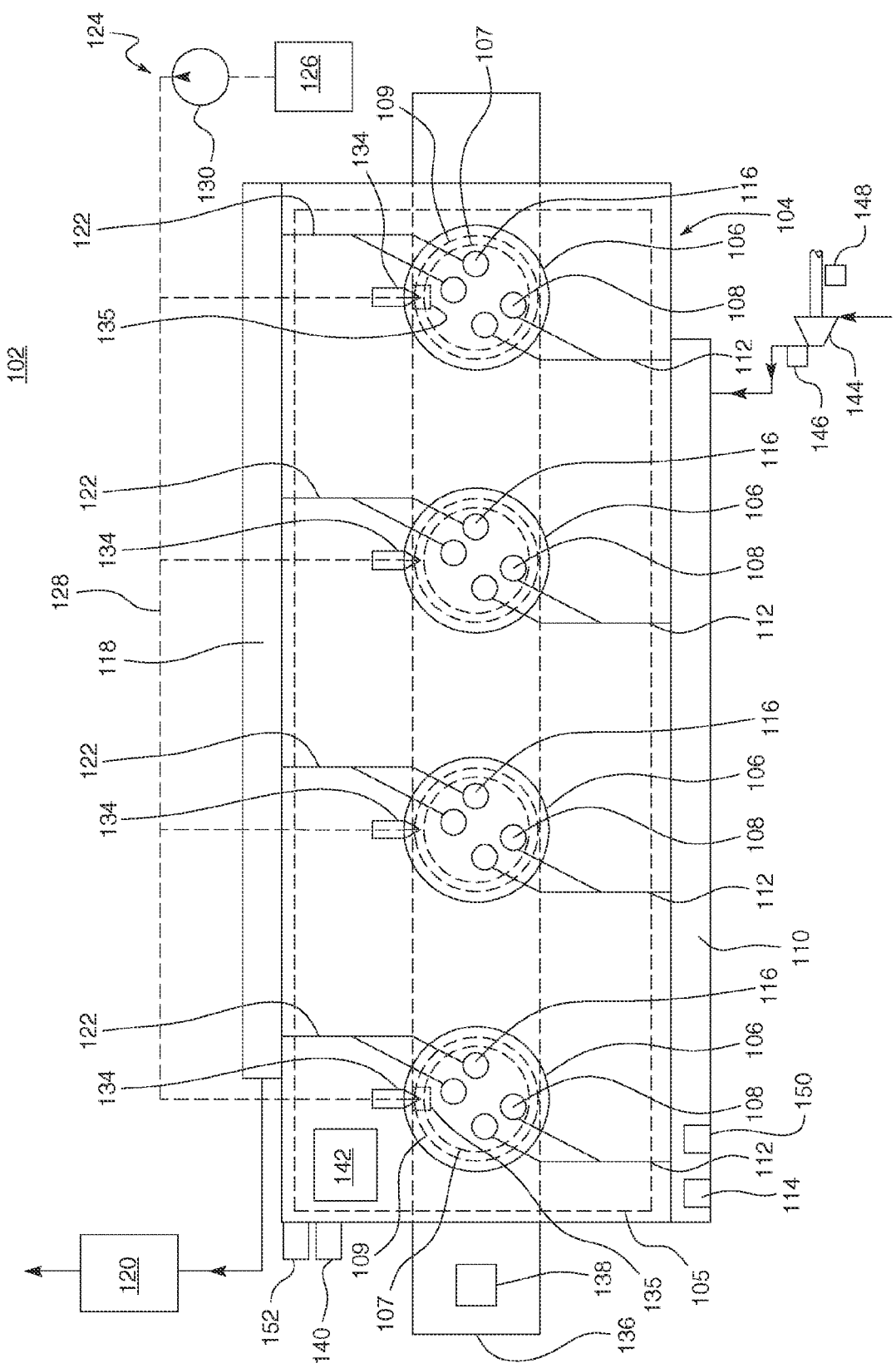
FIG. 1 illustrates an exemplary block diagram of an engine including valves, pistons, liners, a cylinder head, and a pre-chamber associated with the engine, according to an aspect of the disclosure.

Referring to FIG. 1, a block diagram of an exemplary engine 102 is illustrated. In one embodiment, the engine 102 may include a compression ignition engine configured to burn a mixture of air and diesel fuel. In alternative embodiments, the engine 102 may include a spark ignition engine such as a natural gas engine, a gasoline engine, or any multi-cylinder reciprocating internal combustion engine known in the art. The engine 102 includes an engine block 104 and a cylinder head 105. The engine block 104 includes a plurality of cylinders 106. Each of the plurality of cylinders 106 includes a piston 107 and a liner 109 disposed within the cylinder 106. Although four cylinders 106 are shown in an inline configuration, in other embodiments fewer or more cylinders 106 may be included or another configuration such as a V-configuration may be employed. The engine 102 may be configured for any suitable application such as motor vehicles, work machines, locomotives or marine engines, and in stationary applications such as electrical power generators.

Each cylinder 106 includes one or more intake valves 108. The intake valves 108 may be configured to supply air for combustion with a fuel in the cylinder 106. In the illustrated embodiment, the intake valves 108 are provided at the top of the cylinder 106. Alternatively, the intake valves 108 may be placed at other locations such as through a sidewall of the cylinder 106. An intake manifold 110 may be formed or attached to the engine block 104 such that the intake manifold 110 extends over or is proximate to each of the cylinders 106.

Fluid communication between the intake manifold 110 and the cylinders 106 may be established by a plurality of intake runners 112 extending from the intake manifold 110 to the cylinders 106. Additionally, an intake air system (not shown) may be provided in fluid communication with the intake manifold 110 in order to direct air to the engine 102. The intake air system may include a number of components known in the art including, but not limited to, a turbocharger and an air filter.

The intake manifold 110 may receive compressed air from a compressor 144. The compressor 144 may be driven by an exhaust turbine in a turbocharger arrangement; driven by mechanical power conveyed from the engine 102 crankshaft to the compressor 144 by a drive belt, a drive chain, a drive shaft, or the like; driven by combinations thereof; or driven by any other compressor drive means known in the art. A boost pressure sensor 150 is in fluid communication with a discharge port of the compressor 144 and disposed along the intake air flow path between the discharge port of the compressor 144 and the intake valves 108.

An operational parameter sensor such as an intake manifold temperature sensor 114 may be provided in association with the intake manifold 110. The intake manifold temperature sensor 114, hereinafter referred to as a temperature sensor 114, may be any sensor known in the art for sensing a temperature of the intake manifold 110. The temperature sensor 114 may include, but is not limited to, a thermocouple, a thermistor, a resistance type temperature sensor, an infrared sensor, and a silicon bandgap type temperature sensor, for example. The temperature sensor 114 may be configured to generate a temperature signal S1 (see FIG. 2) indicative of the temperature of the intake manifold 110 and/or air present in the intake manifold 110.

The cylinders 106 may include one or more exhaust valves 116. The exhaust valves 116 may be configured to discharge exhaust gas from the cylinders 106 after combustion events. An exhaust manifold 118 communicating with an exhaust system 120 may also be disposed in or proximate to the engine block 104. The exhaust manifold 118 receives exhaust gases through the exhaust valves 116 associated with each cylinder 106. The exhaust manifold 118 may fluidly communicate with the cylinders 106 through exhaust runners 122 extending from the exhaust manifold 118.

A fuel system 124 is operatively associated with the engine 102 to supply the fuel that the engine 102 burns during the combustion process. The fuel system 124 may include a fuel reservoir 126. The fuel reservoir 126 may be configured to accommodate the fuel such as distillate diesel, biodiesel, gasoline, dimethyl ether, liquefied petroleum gas, natural gas, hydrogen, combinations thereof, or any other combustion fuel known in the art. Although only one fuel reservoir 126 is depicted in the illustrated embodiment, it will be appreciated that in other embodiments additional fuel reservoirs 126 may be included to accommodate the same or different types of fuels required in the combustion process. A fuel line 128 may be provided in the fuel system 124 to direct the fuel from the fuel reservoir 126 to the engine 102. A fuel pump 130 may be provided in the fuel line 128 to pressurize and drive a flow of the fuel through the fuel line 128. The fuel system 124 may include multiple fuel injectors 134 fluidly coupled to the fuel line 128 to introduce the fuel into the cylinders 106. At least one fuel injector 134 may be associated with each cylinder 106. In one embodiment where the engine 102 is fueled with natural gas, a pre-chamber 135 may be provided in association with the cylinder 106 and the fuel injector 134.

In the illustrated embodiment, one fuel injector 134 is associated with each cylinder 106. In other embodiments, a different number of injectors 134 may be used. Additionally, in the illustrated embodiment, the fuel line 128 terminates at the fuel injectors 134. In an alternate embodiment, the fuel line 128 may establish a fuel loop in a manner such that the fuel continuously circulates through the plurality of fuel injectors 134 and, optionally, delivers unused fuel back to the fuel reservoir 126. In some embodiments the fuel line 128 may include a fuel collector volume or rail (not shown), which may supply pressurized fuel to the fuel injectors 134. The fuel injectors 134 may be electrically actuated devices for selectively introducing a predetermined quantity of the fuel to each cylinder 106. Alternatively or additionally, it will be appreciated that the fuel injectors 134 may be mechanically actuated, hydraulically actuated, pneumatically actuated, or actuated by any other actuation means known in the art. In other embodiments, the fuel may be introduced in the intake manifold 110, the intake runners 112 or upstream of the turbocharger.

Each of the cylinders 106 includes a piston 107 and a connecting rod assembly (not shown). During combustion of the mixture of air and fuel introduced in the cylinders 106, high pressure is generated within the cylinders 106. This high pressure acts on the piston 107 and causes a translational motion of the piston 107 within the cylinder 106. The piston 107 is pivotally connected to one end of the connecting rod. The other end of the connecting rod is connected to a crankshaft 136. The connecting rod is configured to convert the translational motion of the piston 107 to a rotary motion of the crankshaft 136.

The number of rotations of the crankshaft 136 during a prescribed period of time defines a speed of the engine 102. An operational parameter sensor like an engine speed sensor 138, hereinafter interchangeably referred to as a speed sensor 138, may be coupled to the crankshaft 136 or a camshaft (not shown) of the engine 102. The speed sensor 138 may be configured to generate a speed signal S2 (see FIG. 2) indicative of the speed of the engine 102. The speed sensor 138 may be any sensor known in the art for sensing of the speed, for example, an optical sensor, an inductive sensor, or a Hall Effect sensor. In another embodiment, the operational parameter sensor may be any other sensor, such as, for example a torque sensor. It should be noted that the operational parameter sensor may be replaced by any other suitable sensor known in the art configured to generate a signal indicative of a required operational parameter as per system design and requirements.

The engine 102 may include an ambient pressure sensor 140, hereinafter referred to as a pressure sensor 140. The pressure sensor 140 may be configured to generate a pressure signal S3 (see FIG. 2) indicative of a pressure of ambient air in which the engine 102 is operating. In an alternate embodiment, the pressure sensor 140 may be an intake manifold pressure sensor. Accordingly, in such a situation, the pressure signal S3 may be indicative of a pressure of the intake manifold of the engine 102. According to another aspect of the disclosure, the engine 102 may have an ambient pressure sensor 140 disposed outside the intake manifold 110, a boost pressure sensor 150 in fluid communication with the intake manifold 110 downstream of the discharge port of the compressor 144 and upstream of the intake valves 108, or both the ambient pressure sensor 140 and the boost pressure sensor 150.

The engine 102 includes a controller 142 configured to determine the temperature associated with a valve, the piston 107, the liner 109, the cylinder head 105, and/or a pre-chamber 135 of the engine 102. The valve may include the intake valve 108 and/or the exhaust valve 116 associated with the engine. The location of the controller 142 shown in the accompanying figures is intended to be exemplary and not limiting. The controller 142 may be located extrinsic or intrinsic to the engine 102. The controller 142 is communicably coupled to the temperature sensor 114, the speed sensor 138, the pressure sensor 140, and components of the fuel system 124 like the fuel pump 130 and the fuel injectors 134.

The controller 142 may embody a single microprocessor or multiple microprocessors that includes a means for receiving signals from the components of the temperature estimation system 202. Numerous commercially available microprocessors may be configured to perform the functions of the controller 142. It should be appreciated that the controller 142 may readily embody a general machine microprocessor capable of controlling numerous machine functions. A person of ordinary skill in the art will appreciate that the controller 142 may additionally include other components and may also perform other functionality not described herein.

Figure 2:
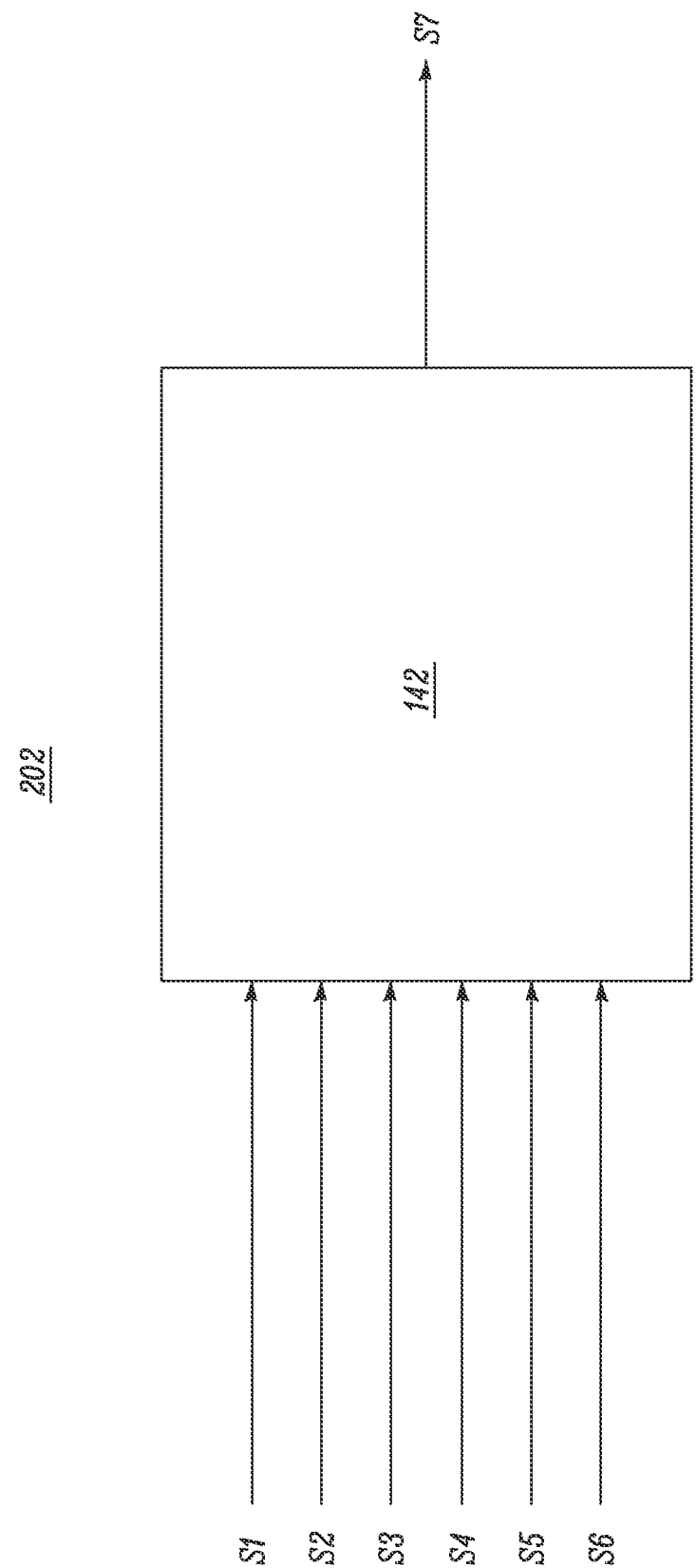
FIG. 2 illustrates an exemplary block diagram of a temperature estimation system, according to an aspect of the disclosure.

Referring to FIG. 2, a block diagram of a temperature estimation system 202 is illustrated. The controller 142 may be configured to receive the temperature signal S1, the speed signal S2 and the pressure signal S3 from the temperature sensor 114, the speed sensor 138, and the pressure sensor 140, respectively. The controller 142 may be configured to determine one or more parameters associated with fuel delivery in a single fuel cycle of the engine 102, where a single fuel cycle of the engine may extend over a full piston cycle from the beginning of an intake stroke to the end of a corresponding exhaust stroke. The parameters may include signals indicative of, but not limited to, a fuel rate, a fuel injection timing, and a fuel injection schedule denoted as S4, S5, S6 respectively in the accompanying figures.

The term "fuel rate signal" (S4) refers to the predetermined quantity of the fuel required to be injected into each of the cylinders 106 by the respective fuel injector 134 for efficient combustion in each cycle. A fuel rate of each cycle is based on a load demand of the engine 102. In one embodiment, the load demand may correspond to a position of a throttle associated with the engine 102. In another embodiment, the load demand may be associated with an operational parameter, such as a speed of a governor of the engine 102.

The term "fuel injection timing signal" (S5) refers to a signal indicative of a predetermined time at which a relatively large quantity of the fuel is injected into each of the cylinders 106 by the respective fuel injector 134 in the single fuel cycle. The injection of the relatively large quantity of the fuel may be considered as a main fuel injection of the fuel cycle.

The term "the fuel injection schedule signal" (S6) refers to the way in which fuel is injected into the cylinders 106. Fuel may either be injected all at once or through a series of pulses during one compression and expansion stroke of a piston 107.

The controller 142 may determine the above mentioned parameters by any known methods known in the art. For example, in one embodiment, the controller 142 may receive signals from various sensors associated with the engine 102, such as, for example, an engine load sensor, an engine temperature sensor, the speed sensor 138, the pressure sensor 140 or any other sensor as per system design. Based on the received signals, the controller 142 may be configured to determine the fuel rate signal S4, the fuel injection timing signal S5, and the fuel injection schedule signal S6.

In another embodiment, the operational parameter of the governor of the engine 102 may be used to determine the fuel rate signal S4 by any method known in the art. The fuel rate signal S4 may be received by the controller 142 to further determine the fuel injection timing signal S5 and the fuel injection schedule signal S6. It should be noted that determination of the fuel rate signal S4, the fuel injection timing signal S5, and the fuel injection schedule signal S6 may be done by any method known to one skilled in the art and specific examples disclosed herein do not limit the scope of the disclosure.

The controller 142 is configured to estimate the temperature of the valve 108, 116, the piston 107, the liner 109, the cylinder head 105, and/or a pre-chamber 135 as a function of the temperature signal S1, the speed signal S2, the pressure signal S3, the fuel rate signal S4, the fuel injection timing signal S5, and the fuel injection schedule signal S6. The controller 142 is configured to generate an output signal S7 indicative of the estimated temperature of the valve 108, 116, the piston 107, the liner 109, the cylinder head 105, the pre-chamber 135, or combinations thereof.

The estimation of the temperature of the valve 108, 116, the piston 107, the liner 109, the cylinder head 105 and/or the pre-chamber 135 may be done in different ways. In one embodiment, the controller 142 may be configured to correlate the temperature signal S1, the speed signal S2, the pressure signal S3, the fuel rate signal S4, the fuel injection timing signal S5, and the fuel injection schedule signal S6 with a pre-calibrated reference map stored in a database (not shown) or an internal memory of the controller 142. The reference map may include pre-calibrated readings corresponding to the temperature of the valve 108, 116, the piston 107, the liner 109, the cylinder head 105 and/or the pre-chamber 135 against different values of the temperature signal S1, the speed signal S2, the pressure signal S3, the fuel rate signal S4, the fuel injection timing signal S5, and the fuel injection schedule signal S6.

In another embodiment, the controller 142 may be configured to compute the temperature of the valve 108, 116, the piston 107, the liner 109, the cylinder head 105, and/or the pre-chamber 135 based on a predetermined mathematical relation, such as an equation. This, mathematical relation may include a polynomial regression model, a physics based model, a neural network model, or any other model or algorithm known in the art. Hence, the output signal S7 may be indicative of an instantaneous estimation of the temperature of the valve 108, 116, the piston 107, the liner 109, the cylinder head 105, and/or the pre-chamber 135 as determined by the controller 142 based on the above-mentioned factors.

There is a thermal inertia associated with a material of the valve 108, 116, the piston 107, the liner, the cylinder head 105 and/or the pre-chamber 135. Due to the thermal inertia, the valve 108, 116, the piston 107, the liner 109, the cylinder head 105 and/or the pre-chamber 135 may attain an equilibrium temperature state only after a duration of time. Because of a time delay in reaching an equilibrium temperature, in some instances, the temperature of the valve 108, 116, the piston 107, the liner 109, the cylinder head 105 and/or the pre-chamber 135 as estimated by the controller 142 may be higher than that of an actual temperature of the valve 108, 116, the piston 107, the liner 109, the cylinder head 105 and/or the pre-chamber 135, respectively.

In one embodiment, the controller 142 may be configured to monitor the temperature of the valve 108, 116, the piston 107, the liner 109, the cylinder head 105 and/or the pre-chamber 135 over a predetermined time period. In another embodiment, a low pass filter may be coupled to the controller 142, such that the thermal inertia of the material of the valve 108, 116, the piston 107, the liner 109, the cylinder head 105 and/or the pre-chamber 135 is accounted for through filtering of the output signal S7. A person of ordinary skill in the art will appreciate that other known methods may also be utilized to filter the output signal S7.

When the engine 102 is operating at relatively high altitudes, the temperature of the valve 108, 116, the piston 107, the liner 109, the cylinder head 105 and/or the pre-chamber 135 may increase at a more rapid rate as compared to that when the engine 102 is operating at lower altitudes. If the temperature of the valve 108, 116, the piston 107, the liner 109, the cylinder head 105 and/or the pre-chamber 135 rises above a particular operational temperature, the respective component life may be reduced.

In additional embodiments of the present disclosure, the controller 142 may employ a derate control strategy wherein the controller 142 is configured to derate the engine 102 based on the estimated temperature of the valve 108, 116, the piston 107, the liner 109, the cylinder head 105 and/or the pre-chamber 135. It is of interest to minimize the derate of the engine 102. More specifically, the controller 142 is configured to derate the engine 102 when the estimated temperature of the valve 108, 116, the piston 107, the liner 109, the cylinder head 105 and/or the pre-chamber 135 is equal to or exceeds a respective predetermined threshold. The predetermined threshold may be a maximum allowable temperature of the valve 108, 116, the piston 107, the liner 109, the cylinder head 105 and/or the pre-chamber 135 and may vary based on the material of the valve 108, 116, the piston 107, the liner 109, the cylinder head 105 and/or the pre-chamber 135, respectively. Alternatively, in one embodiment, the predetermined threshold may be a percentage of the maximum allowable temperature of the valve 108, 116, the piston 107, the liner 109, the cylinder head 105 and/or the pre-chamber 135.

The derate of the engine 102 may be performed using any methods for derating engines known in the art. For example, a supply of the fuel to the one or more cylinders 106 may be reduced or terminated in order to derate the engine 102. As a result, the combustion of the fuel in the cylinders 106 may be reduced leading to a decrease in the temperature of the valve 108, 116, the piston 107, the liner 109, the cylinder head 105 and/or the pre-chamber 135. In one embodiment, the controller 142 may be configured to determine an extent or duration of the derate of the engine 102 based on factors such as controlling a quantity of reduction in the fuel supply to the cylinders 106.

The extent of the derate may be based on a difference between the estimated temperature of the valve 108, 116, the piston 107, the liner 109, the cylinder head 105 and/or the pre-chamber 135 and the respective predetermined threshold. Further, the controller 142 may be configured to continuously monitor the estimated temperature of the valve 108, 116, the piston 107, the liner 109, the cylinder head 105 and/or the pre-chamber 135 during the derate. Moreover, when the monitored temperature of the valve 108, 116, the piston 107, the liner 109, the cylinder head 105 and/or the pre-chamber 135 reaches or falls below the respective predetermined threshold, the controller 142 may be configured to deactivate the derate control strategy. It should be understood that the embodiments and the configurations and connections explained herein are merely exemplary and may not limit the scope and spirit of the disclosure.

Figure 4:
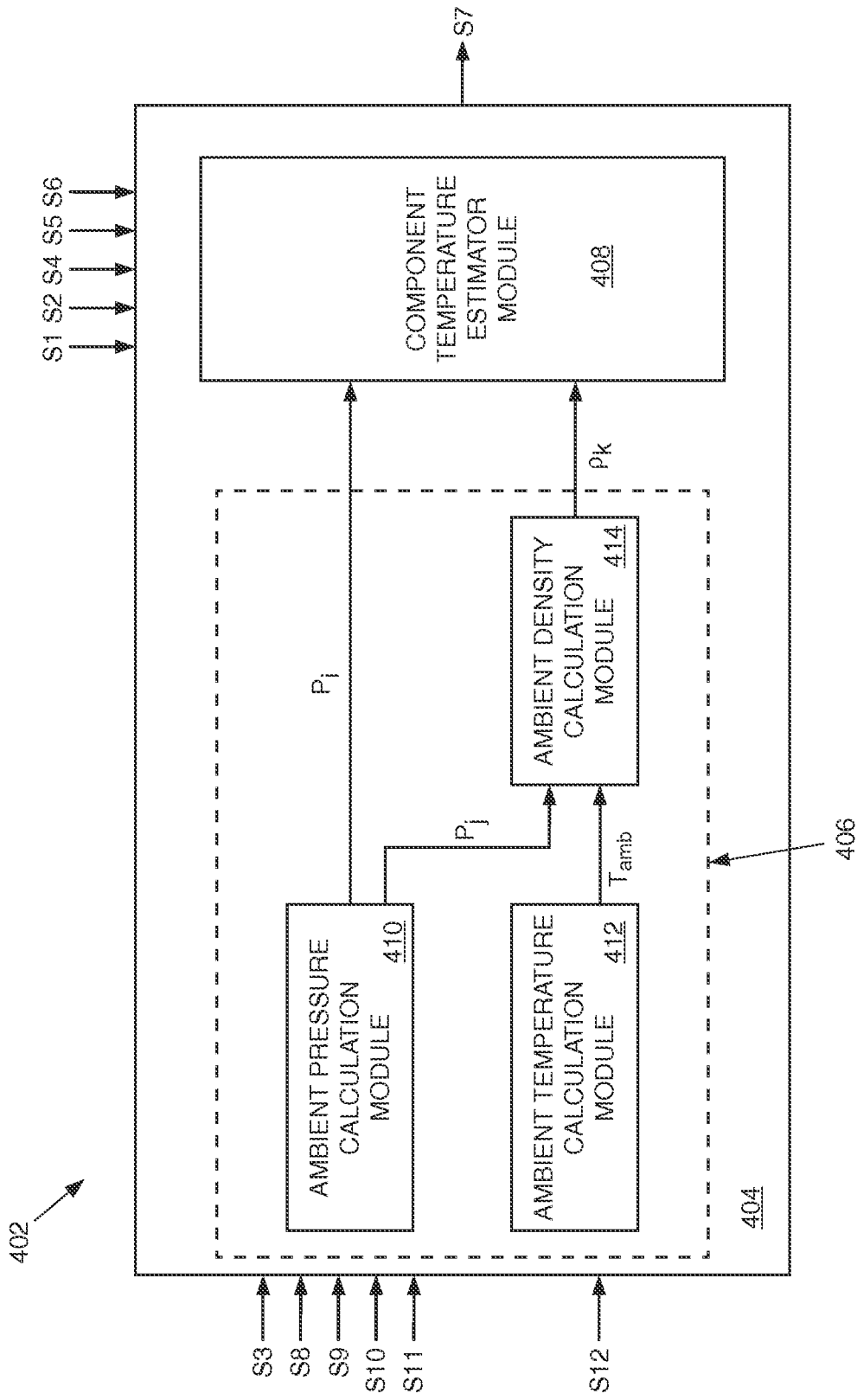
FIG. 4 shows a schematic view of a temperature estimation system, according to another aspect of the disclosure.

FIG. 4 shows a schematic view of a temperature estimation system 402, according to another aspect of the disclosure. Similar to the temperature estimation system 202 (see FIG. 2), the temperature estimation system 402 includes a controller 404 that receives signal inputs S1-S6 and generates an output signal S7, which may be indicative of a temperature estimation for the intake valve 108, the exhaust valve 116, the piston 107, the liner 109, the cylinder head 105, the pre-chamber 135, combinations thereof, or other engine component in fluid or thermal communication with exhaust gas generated by the engine 102. In addition, the controller 404 receives a signal S8 indicative of an altitude of the engine 102, a signal S9 indicative of a mass flow through a compressor 144 that is fluidly coupled to the intake manifold 110 of the engine 102, a signal S10 indicative of a rotational speed of the compressor 144, a signal S11 indicative of a boost pressure downstream of the compressor 144 and upstream of the intake valves 108, a signal S12 indicative of an ambient temperature surrounding the engine 102, or combinations thereof.

Similar to the controller 142, the controller 404 may embody a single microprocessor or multiple microprocessors that includes a means for receiving signals from various other components, including sensors. Numerous commercially available microprocessors may be configured to perform the functions of the controller 404. It should be appreciated that the controller 404 may readily embody a general machine microprocessor capable of controlling numerous machine functions. It will be appreciated that the controller 404 may additionally include other components and may also perform other functionality not described herein. Further, it will be appreciated that the controller 404 could be integrated into the engine 102 shown in FIG. 1 in addition to the controller 142, or in place of the controller 142.

The controller 404 includes an ambient condition module 406 for determining a condition of the atmosphere surrounding the engine 102 and a component temperature estimator module 408 for estimating a temperature of a component of the engine 102 and outputting the estimated component temperature as the output signal S7. The component temperature estimator module 408 is in data communication with the ambient condition module 406.

The ambient condition module 406 includes an ambient pressure calculation module 410 for generating one or more signals $P_i$ (i being an integer greater than or equal to one (1)), indicative of an ambient pressure surrounding the engine 102; an ambient temperature calculation module 412 for generating one or more signals $T_{amb}$ indicative of an ambient temperature surrounding the engine 102; an ambient density calculation module 414 for generating one or more signals $\rho_j$ (j being an integer greater than or equal to one (1)) indicative of a density of air surrounding the engine 102; or combinations thereof. The ambient density calculation module 414 may be in data communication with the ambient pressure calculation module 410, the ambient temperature calculation module 412, or both.

Figure 5:
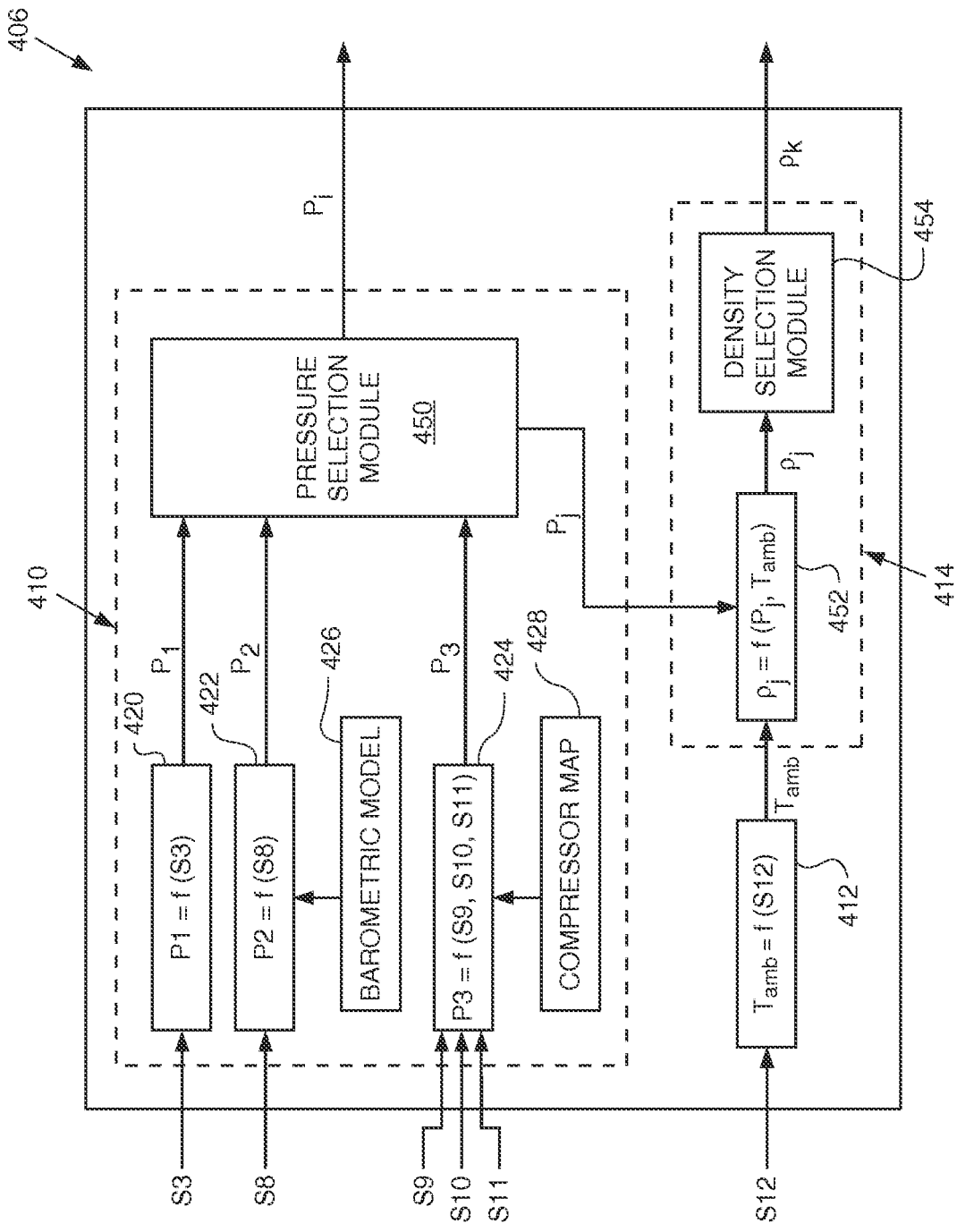
FIG. 5 shows a schematic view of an ambient condition module, according to an aspect of the disclosure.

FIG. 5 shows a schematic view of an ambient condition module 406 according to an aspect of the disclosure. The ambient condition module 406 may include a first pressure calculation module 420, a second pressure calculation module 422, a third pressure calculation module 424, or combinations thereof. The first pressure calculation module 420 receives the signal S3 indicative of an ambient pressure surrounding the engine 102 from a sensor and calculates an ambient pressure $P_1$ as a function of the signal S3. As discussed previously, the ambient pressure signal S3 may be generated by the ambient pressure sensor 140, or any pressure sensor known in the art for generating a signal indicative of ambient pressure.

The second pressure calculation module 422 receives the signal S8 indicative of an altitude of the engine 102 and calculates an ambient pressure P2 as a function of the altitude signal S8. According to an aspect of the disclosure, a global positioning system (GPS) sensor generates the signal S8. According to another aspect of the disclosure, an accelerometer integrates changes in altitude from a known altitude to generate the altitude signal S8. It will be appreciated that any altitude sensor known in the art may be used to generate the altitude signal S8. The altitude signal S8 may represent a difference in altitude between the altitude of the engine 102 and sea level, or any other known reference altitude.

The ambient pressure calculation module 410 may further include a barometric pressure model 426 that provides a functional relationship between changes in altitude and corresponding changes in atmospheric pressure. The barometric pressure model 426 may include a look up table of changes in barometric pressure as a function of corresponding changes in altitude.

Alternatively or in addition, the barometric pressure model 426 may include a mathematical relation between changes in barometric pressure as a function of corresponding changes in altitude. The mathematical relation in the barometric pressure model 426 may embody a physics-based model based on an equation of state for standard air or an equation of state for an idealization of the composition of air local to the engine 102. Alternatively or in addition, the mathematical relation in the barometric pressure model 426 may be based on an empirical regression of atmospheric pressure data as a function of changes in altitude. In turn, the second pressure calculation module 422 may calculate an ambient pressure $P_2$ surrounding the engine 102 based on the altitude signal S8 and the barometric pressure model 426.

The third pressure calculation module 424 may receive the compressor mass flow signal S9, the compressor speed signal S10, and the boost pressure signal S11 and calculate an ambient pressure P3 based at least in part on the signals S9-S11. The compressor mass flow signal S9 may be generated by a mass flow sensor 146 (see FIG. 1) measuring a mass flow of fluid through the compressor 144. The mass flow sensor 146 may be any mass flow sensor known in the art including, for example, a virtual sensor based at least in part on an engine pumping characteristic and the speed of the engine 102.

The compressor speed signal S10 may be a speed sensor 148 that is operatively coupled with a shaft of the compressor 144 or any other rotating component of the compressor 144, for example. The boost pressure signal S11 may be generated by a pressure sensor 150 in fluid communication with the discharge of the compressor 144 anywhere between the discharge of the compressor 144 and the intake valves 108. According to an aspect of the disclosure, the pressure sensor 150 is in direct fluid communication with the intake manifold 110.

The ambient pressure calculation module 410 may also include a compressor map module 428 that includes a model for relating a mass flow through the compressor 144 to the speed of the compressor 144 and a pressure ratio across the compressor 144. According to an aspect of the disclosure the pressure ratio across the compressor 144 is a ratio of a discharge pressure of the compressor to an inlet pressure of the compressor. According to another aspect of the disclosure, the inlet pressure of the compressor 144 is taken to be an ambient pressure surrounding the engine 102. It will be appreciated that the compressor map module 428 may be embodied as a look up table or one or more mathematical relations characterizing a relation between the mass flow through the compressor 144, and the speed of the compressor 144 and the pressure ratio across the compressor 144.

Figure 6:
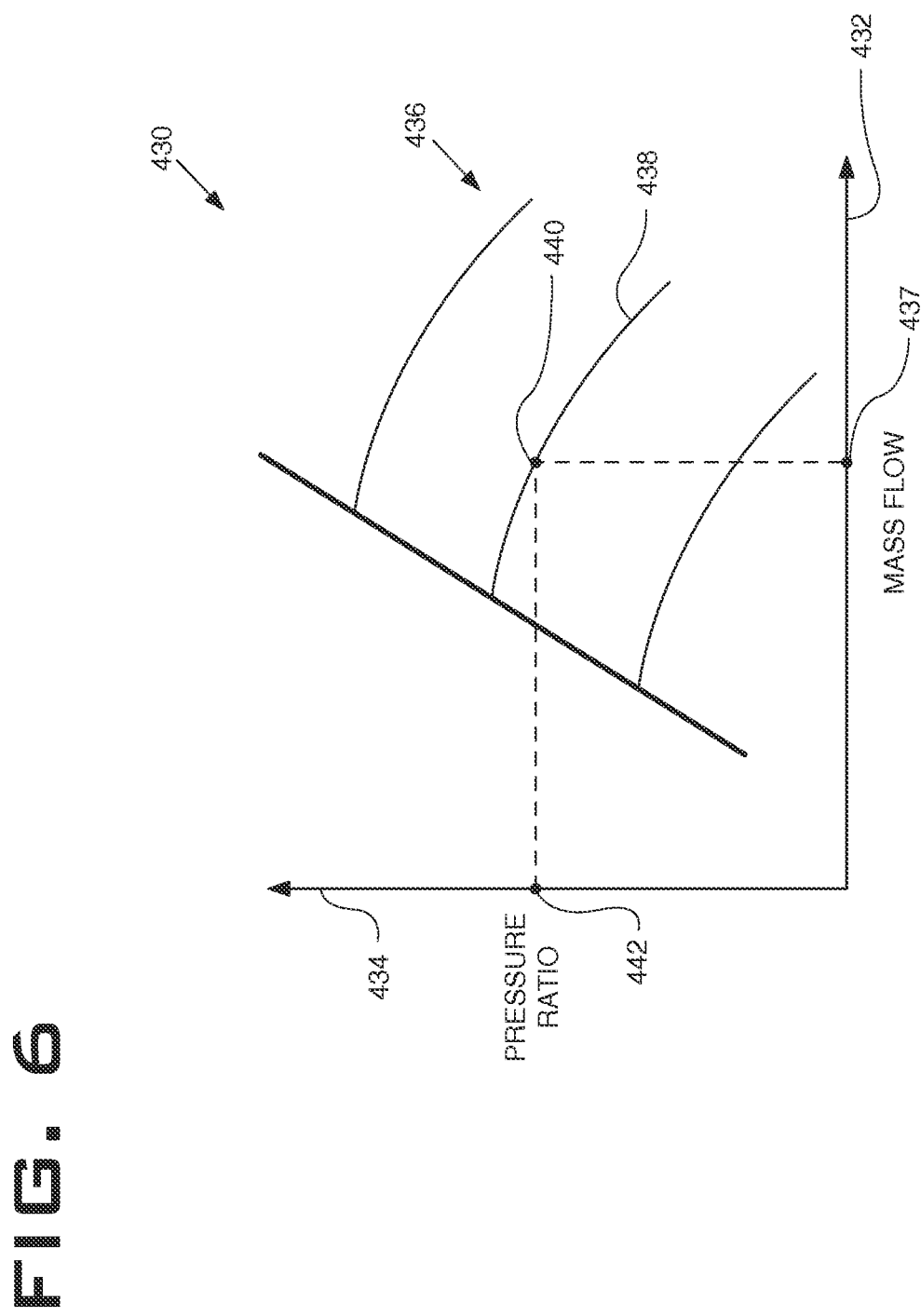
FIG. 6 shows a schematic view of a compressor map embodied in a compressor map module, according to an aspect of the disclosure.

FIG. 6 shows a schematic view of a compressor map 430 embodied in the compressor map module 428, according to an aspect of the disclosure. The compressor map 430 includes a horizontal axis 432 indicative of a mass flow through the compressor 144, a vertical axis 434 indicative of a pressure ratio across the compressor 144, and a family of curves, each indicative of a constant speed of the compressor 144.

Referring to both FIGS. 5 and 6, an example of calculating an ambient pressure in the third pressure calculation module 424 will now be explained. A value of mass flow 437 through the compressor 144 and a constant speed line 438 corresponding to a speed of the compressor 144 are identified on the compressor map 430. Next a point 440 on the constant speed line 438 is identified corresponding to the mass flow value 436. Then a pressure ratio 442 corresponding to the point 440 is identified, and the ambient pressure is calculated as the boost pressure corresponding to the boost pressure signal S11 divided by the pressure ratio 442 corresponding to the point 440.

Returning to FIG. 5, the ambient pressure calculation module 410 may further include a pressure selection module 450 in data communication with the various pressure calculation modules 420, 422, 424, for example. According to an aspect of the disclosure, the pressure selection module 450 selects one or more pressure signals $P_i$ to transmit to the component temperature estimator module 408. The one or more pressure signals $P_i$ may include one or more of the pressure P1 calculated by the first pressure calculation module 420, the pressure P2 calculated by the second pressure calculation module 422, or the pressure P3 calculated by the third pressure calculation module 424, for example.

Alternatively or in addition, the one or more pressure signals $P_i$ may include arithmetic combinations of the pressures P1, P2, or P3, for example, according to an average, a weighted average, a cost function, a Kalman filter, or any other function for combining values known to persons having skill in the art. The pressure selection module 450 may determine that one or more of the pressures P1, P2, or P3 may be out of a range, and therefore unreliable, and act to block out of range pressure values from advancing to the component temperature estimator module 408 (see FIG. 4). To determine whether a pressure value is out of range, the pressure selection module 450 may compare the pressure value to an upper limit value, a lower limit value, or both.

The ambient temperature calculation module 412 receives the ambient temperature signal S12 and calculates an ambient temperature $T_{amb}$. The ambient temperature signal S12 may be generated by an ambient temperature sensor 152 (see FIG. 1) in thermal communication with an ambient environment of the engine 102. It will be appreciated that the ambient temperature sensor 152 may be a thermocouple, a thermistor, an RTD, combinations thereof, or any other temperature sensor known in the art.

The ambient density calculation module 414 receives an ambient temperature signal $T_{amb}$ from the ambient temperature calculation module 412, and one or more ambient pressure signals $P_j$ (j being an integer greater than or equal to one (1)) from the ambient pressure calculation module 410 to generate one or more ambient density signals $\rho_j$ based on a density model 452. The ambient density calculation module 414 may calculate the one or more ambient density signals $\rho_j$ based on a look up table, one or more equations of state, such as the Ideal Gas Law, for example, or any other method for calculating a gas density based on a composition, a temperature, and a pressure of the gas.

The pressure selection module 450 may select the one or more pressure signals $P_j$ to transmit to the ambient density calculation module 414. The one or more pressure signals $P_j$ may include one or more of the pressure P1 calculated by the first pressure calculation module 420, the pressure P2 calculated by the second pressure calculation module 422, or the pressure P3 calculated by the third pressure calculation module 424, for example.

Alternatively or in addition, the one or more pressure signals $P_j$ may include arithmetic combinations of the pressures P1, P2, or P3, for example, according to an average, a weighted average, a cost function, a Kalman filter, or any other function for combining values known to persons having skill in the art. The pressure selection module 450 may determine that one or more of the pressures P1, P2, or P3 may be out of range, and therefore unreliable, and act to block out of range pressure values from advancing to the ambient density calculation module 414. The one or more ambient pressure signals $P_j$ may be the same as or different from the one or more ambient pressure signals $P_i$ discussed previously.

The ambient density calculation module 414 may include a density selection module 454 that receives the one or more density signals $\rho_j$. According to an aspect of the disclosure the density selection module 454 selects one or more density signals $\rho_k$ from the one or more density signals $\rho_j$ to transmit to the component temperature estimator module 408. The one or more density signals $\rho_k$ may be based at least in part on one or more of the pressure P1 calculated by the first pressure calculation module 420, the pressure P2 calculated by the second pressure calculation module 422, or the pressure P3 calculated by the third pressure calculation module 424, for example.

Alternatively or in addition, the one or more density signals $\rho_k$ may include arithmetic combinations of the one or more density signals $\rho_j$, for example, according to an average, a weighted average, a cost function, a Kalman filter, or any other function for combining values known to persons having skill in the art. The density selection module 454 may determine that one or more of the density signals $\rho_j$ may be out of a range, and therefore unreliable, and act to block out of range density values from advancing to the component temperature estimator module 408. To determine whether a density value is out of range, the density selection module 454 may compare the density value to an upper limit value, a lower limit value, or both.

Figure 7:
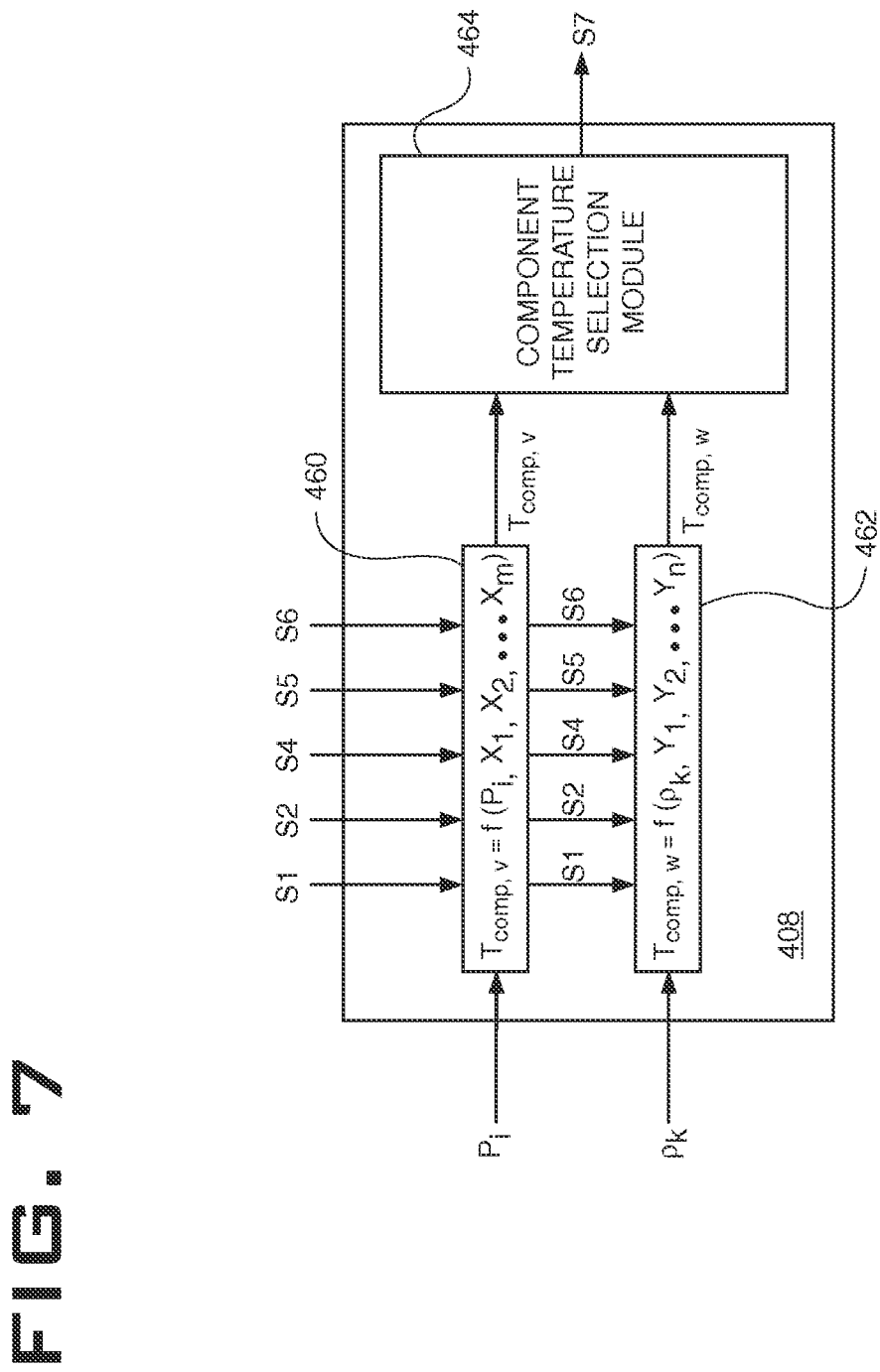
FIG. 7 shows a schematic view of a component temperature estimator module, according to an aspect of the disclosure.

FIG. 7 shows a schematic view of a component temperature estimator module 408, according to an aspect of the disclosure. The component temperature estimator module 408 includes a pressure-based function block 460 and a density-based function block 462. The component temperature estimator module 408 may also include a component temperature selection module 464. In operation, the component temperature estimator module 408 may receive one or more of the signals S1-S6 and S8-S12, the one or more pressure signals $P_i$, the one or more density signals $\rho_k$, combinations thereof, or any other signals known in the art to be relevant to operation of the engine 102, and calculate the output signal S7 based on the inputs received.

The pressure-based function block 460 receives inputs from one or more of the signals S1-S6 and S8-S12, the one or more pressure signals $P_i$, combinations thereof, or any other signals known in the art to be relevant to operation of the engine 102. The pressure-based function block 460 calculates one or more component temperatures $T_{comp\_v}$, based on the one or more pressure signals $P_i$, and one or more engine 102 operating parameters X1, X2, ... Xm, where v is an integer greater than or equal to one (1) and m is an integer greater than or equal to one (1). The one or more engine 102 operating parameters X1, X2, ... Xm may include one or more signals from S1-S6 and S8-S12, operating parameters derived from one or more signals from S1-S6 and S8-S12, combinations thereof, or any other parameter known to be relevant to operation of the engine 102.

The density-based function block 462 receives inputs from one or more of the signals S1-S6 and S8-S12, the one or more density signals $\rho_k$, combinations thereof, or any other signals known in the art to be relevant to operation of the engine 102. The density-based function block 462 calculates one or more component temperatures $T_{comp\_w}$, based on the one or more density signals $\rho_k$, and one or more engine 102 operating parameters Y1, Y2, ... Yn, where w is an integer greater than or equal to one (1) and n is an integer greater than or equal to one (1). The one or more engine 102 operating parameters Y1, Y2, ... Yn may include one or more signals from S1-S6 and S8-S12, operating parameters derived from one or more signals from S1-S6 and S8-S12, combinations thereof, or any other parameter known to be relevant to operation of the engine 102. It will be appreciated that the density-based function block 462 may also receive the one or more pressure signals $P_i$, and the pressure-based function block 460 may also receive the one or more density signals $\rho_k$.

The component temperature selection module 464 receives the one or more component temperatures $T_{comp\_v}$, the one or more component temperatures $T_{comp\_w}$, or combinations thereof, and based at least in part on those inputs, determines and outputs the output signal S7. The component temperature selection module 464 may select one of the one or more component temperatures $T_{comp\_v}$, and the one or more component temperatures $T_{comp\_w}$ for output as the output signal S7. This selection may be based on an uncertainty or confidence calculation associated with each of the component temperatures received by the component temperature selection module 464, such that a component temperature estimate with a low or lowest uncertainty, a high or highest confidence, or both, is output as the output signal S7.

Alternatively, the component temperature selection module may arithmetically combine one or more of the component temperatures $T_{comp\_v}$ and/or $T_{comp\_w}$ to generate the output signal S7. Arithmetic combinations of the component temperatures $T_{comp\_v}$ and/or $T_{comp\_w}$ may include an average, a weighted average, a cost function, a Kalman filter, or any other arithmetic combination of values known in the art.

Alternatively or additionally, the component temperature selection module 464 may determine that one or more of the component temperatures $T_{comp\_v}$ and/or $T_{comp\_w}$ may be out of a range, and therefore unreliable, and act to block out of range component temperature values from advancing to the output signal S7. To determine whether a component temperature value is out of range, the component temperature selection module 464 may compare the component temperature value to an upper limit value, a lower limit value, or both.

Alternatively or additionally, the component temperature selection module 464 may determine the output signal S7 based at least in part on a time history of the component temperatures $T_{comp\_v}$ and/or $T_{comp\_w}$. For example, statistics from a time history of the component temperatures $T_{comp\_v}$ and/or $T_{comp\_w}$ may be used in part to determine and uncertainty or confidence in any one of the calculated component temperatures. As discussed previously, such time history analysis of signals may help compensate for thermal inertia of engine components in estimating temperatures thereof.

INDUSTRIAL APPLICABILITY

Excessively high operating temperatures may limit the useful life of intake or exhaust valves on an engine, which may result in engine downtime or increased maintenance cost. To promote engine component life, engine derating may be employed to operate the engine within allowable temperature limits. Derate of the engine may help control temperatures of engine components such as valves, pistons, liners, cylinder heads, and/or the pre-chambers, thereby extending the useful life of these components.

The controllers 142 or 404 disclosed herein may be configured to estimate the temperature of the valve 108, 116, the piston 107, the liner 109, the cylinder head 105, and/or the pre-chamber 135 as a function of any one of the signals S1-S6 and S8-S12, combinations thereof, or any other parameter known in the art to be relevant to operation of the engine 102. The derate control strategy adopted by the controller 142, 404 may help provide more robust and efficient control of the engine 102 than a controller without the derate control strategy.

Figure 3:
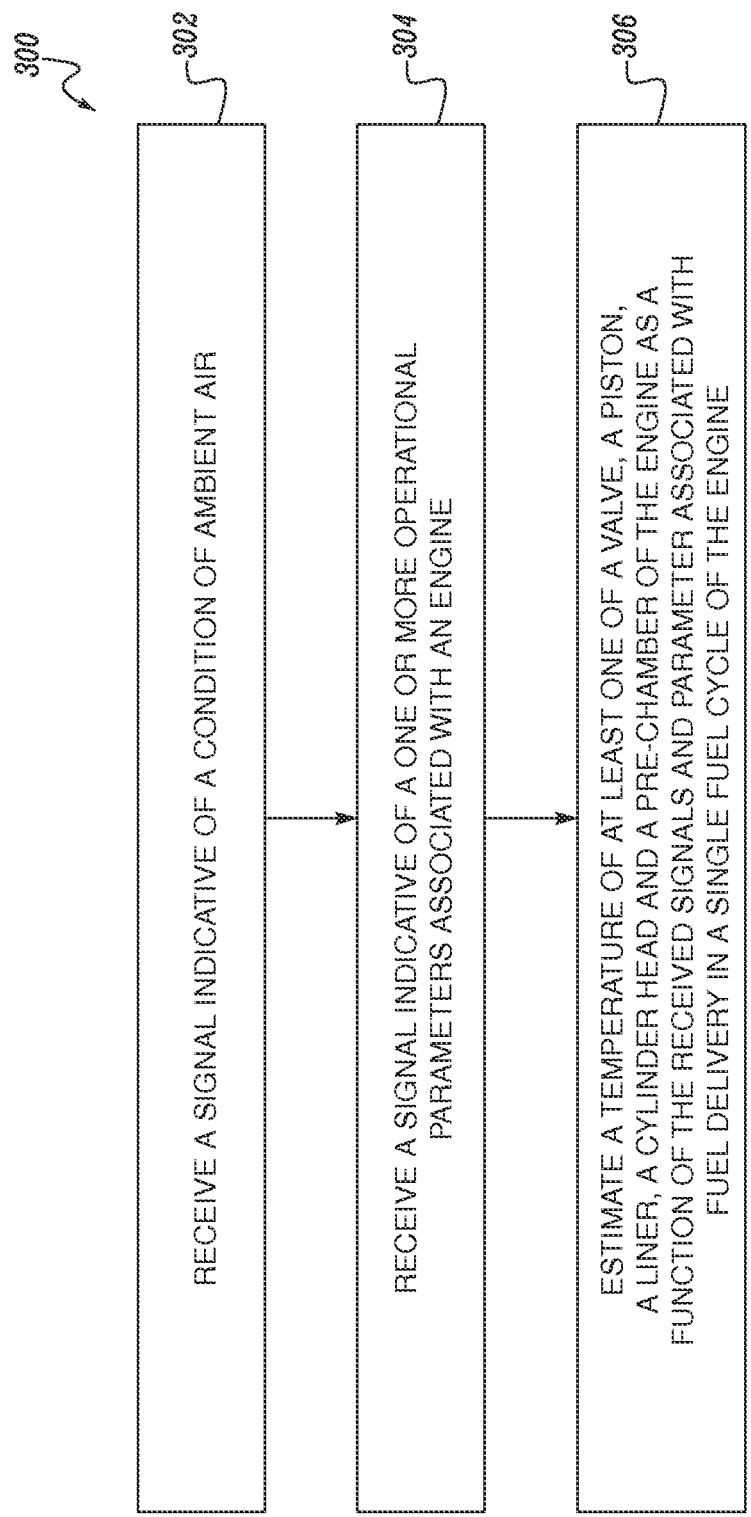
FIG. 3 illustrates an exemplary flowchart of a method for determining a temperature of the valve, the piston, the liner, the cylinder head, and the pre-chamber of the engine, according to an aspect of the disclosure.

FIG. 3 illustrates a flowchart of a method 300 for estimating the temperature of the valve 108, 116, the piston 107, the liner 109, the cylinder head 105 and/or the pre-chamber 135. At step 302, the controller 142 receives one or more signals indicative of the state of ambient air. According to one aspect of the disclosure the state of ambient air is a pressure of ambient air. According to another aspect of the disclosure, the state of ambient air is a density of ambient air.

At step 304, the controller 142, 404 receives the signal indicative of the one or more operational parameters associated with the engine 102. More specifically, the controller 142, 404 receives the speed signal S2 indicative of the speed of the engine 102 and the temperature signal S1 indicative of the temperature of the intake manifold 110 of the engine 102.

At step 306, the controller 142, 404 estimates the temperature of the valve 108, 116, the piston 107, the liner 109, the cylinder head 105 and/or the pre-chamber 135 of the engine 102 as the function of the temperature signal S1, the speed signal S2, the pressure signal S3 and the parameters associated with the fuel delivery in the single fuel cycle of the engine 102. These parameters include the fuel rate signal S4, the fuel injection timing signal S5 and the fuel injection schedule signal S6.

In one embodiment, the controller 142, 404 may estimate the temperature of the valve 108, 116, the piston 107, the liner 109, the cylinder head 105 and/or the pre-chamber 135 by correlating the temperature signal S1, the speed signal S2, the pressure signal S3, the fuel rate signal S4, the fuel injection timing signal S5, the fuel injection schedule signal S6, or combinations thereof, with a pre-calibrated reference map. In another embodiment, the controller 142, 404 may compute the temperature of the valve 108, 116, the piston 107, the liner 109, the cylinder head 105 and/or the pre-chamber 135 as a function of any one of the signals S1-S6 and S8-S12, or combinations thereof.

In additional embodiments, the controller 142, 404 may monitor the temperature of the valve 108, 116, the piston 107, the liner 109, the cylinder head 105 and/or the pre-chamber 135 over the time period for estimating the temperature of the valve 108, 116, the piston 107, the liner 109, the cylinder head 105 and/or the pre-chamber 135, respectively. Also, as explained earlier, the controller 142, 404 may derate the engine 102 when the estimated temperature of the valve 108, 116, the piston 107, the liner 109, the cylinder head 105 and/or the pre-chamber 135 exceeds the respective predetermined threshold.

From the foregoing it will be appreciated that, although specific embodiments have been described herein for purposes of illustration, various modifications or variations may be made without deviating from the spirit or scope of inventive features claimed herein. Other embodiments will be apparent to those skilled in the art from consideration of the specification and figures and practice of the arrangements disclosed herein. It is intended that the specification and disclosed examples be considered as exemplary only, with a true inventive scope and spirit being indicated by the following claims and their equivalents.

What is claimed is:

1. An engine system comprising:
   an ambient condition module configured to generate a signal indicative of a state of ambient air during an operation of an engine;
   an operational parameter sensor configured to generate a signal indicative of one or more operational parameters associated with the engine, the one or more operational parameters including a temperature of an intake manifold of the engine; and
   a controller operably coupled to the ambient condition module and the operational parameter sensor, the controller configured to:
      receive the signal indicative of the state of ambient air;
      receive the signal indicative of the one or more operational parameters associated with the engine;
      estimate a temperature of at least one of a valve, a piston, a liner, a cylinder head, and a pre-chamber of the engine as a function of the received signals and parameters associated with fuel delivery to the engine; and
      derate the engine maximum power rating when the estimated temperature of at least one of the valve, the piston, the liner, the cylinder head, and the pre-chamber exceeds a respective predetermined threshold.

2. The system of claim 1, wherein the parameters include a fuel rate, a fuel injection timing, and a fuel injection schedule.

3. The system of claim 2, wherein the fuel rate is derived from a load demand associated with the engine.

4. The system of claim 1, wherein the one or more operational parameters includes a speed of the engine.

5. The system of claim 1, wherein the valve is at least one of an intake valve and an exhaust valve of the engine.

6. The system of claim 1, wherein the controller is further configured to correlate the received signals with a pre-calibrated map for estimating the temperature of at least one of the valve, the piston, the liner, the cylinder head, and the pre-chamber of the engine.

7. The system of claim 1, wherein the controller is further configured to compute the temperature of at least one of the valve, the piston, the liner, the cylinder head, and the pre-chamber of the engine as the function of the received signals and the parameters associated with fuel delivery.

8. The system of claim 1, wherein the controller is further configured to monitor the temperature of at least one of the valve, the piston, the liner, the cylinder head, and the pre-chamber over a predetermined time period for estimating the respective temperature of the valve, the piston, the liner, the cylinder head, and the pre-chamber.

9. The system of claim 1, wherein the system is employed on a machine.

10. The system of claim 1, wherein the state of ambient air is a pressure of ambient air.

11. The system of claim 1, wherein the state of ambient air is a density of ambient air.

12. The system of claim 1, wherein the state of ambient air is a temperature of ambient air.

13. A method for determining a temperature of a component of an engine, the method comprising:
   receiving a signal indicative of a pressure of ambient air, the pressure determined, at least in part, in response to a first ambient air pressure signal from a first ambient air pressure sensor, and a second ambient air pressure signal from a second ambient air pressure sensor;
   receiving a signal indicative of one or more operational parameters associated with the engine;
   estimating a temperature of at least one of a valve, a piston, a liner, a cylinder head, and a pre-chamber of the engine as a function of the received signals and parameters associated with fuel delivery in a single fuel cycle of the engine; and
   derating a maximum power rating of the engine when the estimated temperature exceeds a predetermined threshold temperature.

14. The method of claim 13, wherein the one or more operational parameters includes at least one of a fuel rate, a fuel injection timing, and a fuel injection schedule.

15. The method of claim 14, further comprising deriving the fuel rate from a load demand of the engine.

16. The method of claim 13, wherein the one or more operational parameters associated with the engine includes a speed of the engine and a temperature of an intake manifold of the engine.

17. The method of claim 13, wherein the estimating step further comprises correlating the received signals with a pre-calibrated map.

18. The method of claim 13, wherein the estimating step further comprises computing the temperature of at least one of the valve, the piston, the liner, the cylinder head, and the pre-chamber of the engine as the function of the received signals and the parameters associated with fuel delivery.

19. The method of claim 13, wherein the estimating of the temperature of the at least one of the valve, the piston, the liner, the cylinder head, and the pre-chamber includes monitoring the respective temperature of the at least one of the valve, the piston, the liner, the cylinder head, and the pre-chamber over a time period.

20. The engine system of claim 1, wherein the predetermined threshold is determined, at least in part, as a function of the thermal properties of materials of the respective at least one of the valve, the piston, the liner, the cylinder head, and the pre-chamber.

* * * * *